(12) United States Patent
Farre Guiu et al.

(10) Patent No.: US 10,037,605 B2
(45) Date of Patent: Jul. 31, 2018

(54) VIDEO OBJECT TAGGING USING SYNTHETIC IMAGES AND SEGMENTATION HIERARCHIES

(71) Applicant: Disney Enterprises, Inc., Burbank, CA (US)

(72) Inventors: Miquel Angel Farre Guiu, Bern (CH);
Marc Junyent Martin, Barcelona (ES);
Aljoscha Smolic, Aarau (CH)

(73) Assignee: Disney Enterprises, Inc., Burbank, CA (US)

( * ) Notice: Subject to any disclaimer, the term of this patent is extended or adjusted under 35 U.S.C. 154(b) by 165 days.

(21) Appl. No.: 15/245,073

(22) Filed: Aug. 23, 2016

(65) Prior Publication Data

US 2018/0061057 A1 Mar. 1, 2018

(51) Int. Cl.
*G06T 11/60* (2006.01)
*G06T 7/00* (2017.01)
(Continued)

(52) U.S. Cl.
CPC ........ *G06T 7/0081* (2013.01); *G06F 17/3079* (2013.01); *G06F 17/3082* (2013.01);
(Continued)

(58) Field of Classification Search
CPC . G06T 2207/10016; G06T 2207/20016; G06T 7/0081; G06T 11/60; G06T 7/12; G06T 7/215; G06T 2207/20104; G06T 7/11; G06T 7/162; G06F 17/3082; G06F 17/30619; G06F 17/3079; G06F 17/30911; G06F 17/3002; G11B 27/00;
(Continued)

(56) References Cited

U.S. PATENT DOCUMENTS

2013/0343727 A1* 12/2013 Rav-Acha ............ G11B 27/031
386/282
2014/0270708 A1* 9/2014 Girgensohn ............. H04N 9/79
386/282
(Continued)

OTHER PUBLICATIONS

Ting Liu, et al., "Image Segmentation Using Hierarchical Merge Tree", arXiv:1505.06389v3, published Jul. 31, 2016, pp. 1-12.*
(Continued)

*Primary Examiner* — Jin-Cheng Wang
(74) *Attorney, Agent, or Firm* — Farjami & Farjami LLP

(57) ABSTRACT

There is provided a system including a memory and a processor configured to obtain a first frame of a video content including an object and a first region based on a segmentation hierarchy of the first frame, insert a synthetic object into the first frame, merge an object segmentation hierarchy of the synthetic object with the segmentation hierarchy of the first frame to create a merged segmentation hierarchy, select a second region based on the merged segmentation hierarchy, provide the first frame including the first region and the second region to a crowd user for creating a corrected frame, receive the corrected frame from the crowd user including a first corrected region including the object and a second corrected region including the synthetic object, determine a quality based on the synthetic object and the second corrected region, and accept the first corrected region based on the quality.

20 Claims, 7 Drawing Sheets

(51) Int. Cl.
*G06F 17/24* (2006.01)
*G06F 3/0484* (2013.01)
*G06F 17/30* (2006.01)
*G06T 7/11* (2017.01)
*G06T 7/12* (2017.01)
*G06T 7/215* (2017.01)
*G06T 7/162* (2017.01)
*G06K 9/00* (2006.01)

(52) U.S. Cl.
CPC .. *G06F 17/30619* (2013.01); *G06F 17/30911* (2013.01); *G06T 7/11* (2017.01); *G06T 7/12* (2017.01); *G06T 7/215* (2017.01); *G06T 11/60* (2013.01); *G06F 17/3002* (2013.01); *G06K 9/00718* (2013.01); *G06T 7/162* (2017.01); *G06T 2207/10016* (2013.01); *G06T 2207/20016* (2013.01); *G06T 2207/20104* (2013.01)

(58) Field of Classification Search
CPC ....... G06K 2009/4666; G06K 9/00718; G06K 9/00744; G06K 9/4652; G06K 9/52; G06K 9/6256; G06K 9/00765
USPC ........ 382/173, 195, 180, 306; 707/741, 797; 386/282; 345/645, 581
See application file for complete search history.

(56) References Cited

U.S. PATENT DOCUMENTS

| | | |
|---|---|---|
| 2016/0313894 A1 | 10/2016 | Smolic |
| 2016/0379055 A1* | 12/2016 | Loui .................. G06K 9/00718 382/103 |
| 2017/0124727 A1* | 5/2017 | Amat Roldan ........... G06T 7/62 |
| 2017/0236290 A1* | 8/2017 | Sorkine Hornung . G06T 7/0081 382/173 |

OTHER PUBLICATIONS

*GAT, Graphical Annotation Tool*, https://imatge.upc.edu/gat/, Jul. 14, 2012.

* cited by examiner

VIDEO OBJECT TAGGING USING SYNTHETIC IMAGES AND SEGMENTATION HIERARCHIES

BACKGROUND

Image and video segmentation is one of the most fundamental yet challenging problems in computer vision. Dividing an image into meaningful regions requires a high level interpretation of the image that cannot be satisfactorily solved by only looking for homogeneous areas in an image. In the era of big data and vast computing power, one approach to model high level interpretation of images has been to use powerful machine-learning tools on huge annotated databases. While significant advances have been made in recent years, automatic image segmentation is still far from providing accurate results in a generic scenario. The creator of a video may desire to add information or a link to an object in a video, and may wish the added information or link to remain associated with that object throughout a video sequence.

SUMMARY

The present disclosure is directed to video object tagging using synthetic objects and segmentation hierarchies, substantially as shown in and/or described in connection with at least one of the figures, as set forth more completely in the claims.

DETAILED DESCRIPTION

Figure 1:
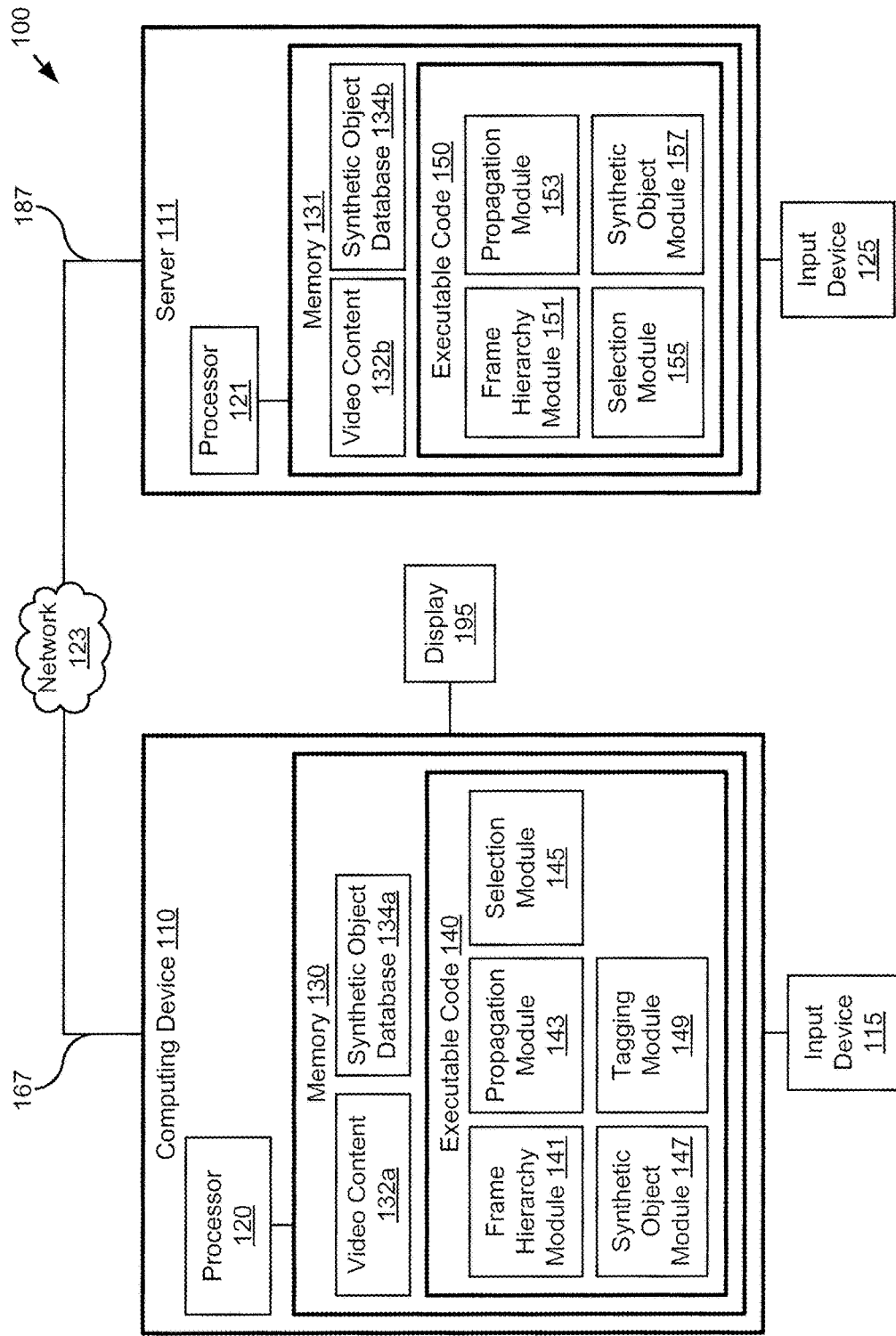
FIG. 1 shows a diagram of an exemplary system for video object tagging using synthetic objects and segmentation hierarchies, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for video object tagging using synthetic objects and segmentation hierarchies, according to one implementation of the present disclosure. System 100 includes computing device 110, input device 115, display 195, server 111, network 123, and input device 125. Computing device 110 includes processor 120 and memory 130. Processor 120 is a hardware processor, such as a central processing unit (CPU) typically found in computing devices. Memory 130 is a non-transitory device for storing computer code for execution by processor 120, and also for storing various data and parameters. Memory 130 includes video content 132a, synthetic object database 134a, and executable code 140. Input device 115 may be a tool for a user to provide input into computing device 110 or any device suitable for providing user input to a video editing system, such as a computer mouse, a computer keyboard, a touch-sense embedded in display 195, etc.

Video content 132a may include a plurality of frames and may be stored in any video format. In some implementations, video content 132a may be MPEG, MPEG-1, MPEG-2, .mov, 0.3gp, .flv, .gif, M4V, WMV, AVCHD, etc. Each frame of video content 132a may include a plurality of elements that make up the frame. For example, in case of a movie, a frame of video content 132a may include one or more actors, a building, a car, and other scene elements, such as trees and bridges. Each of these elements may include further items, such as items of an actor's clothing, the railing on a bridge, the leaves and trunk of a tree, and the windows and walls of a building.

Synthetic object database 134a may be a database including one or more synthetic objects and information about each synthetic object. Synthetic objects may include pictures, drawings, graphics, etc., that are not a part of video content 132a, but which may be inserted into one or more frames of video content 132a. In some implementations, synthetic object database 134a may include a size of each synthetic object, a shape of each synthetic object, an area and/or volume of each synthetic object. Synthetic object database 134a may include an object segmentation hierarchy associated with each synthetic object.

Executable code 140 may include one of more software modules for execution by processor 120. As shown in FIG. 1, executable code 140 includes frame hierarchy module 141, propagation module 143, selection module 145, synthetic object module 147, and tagging module 149. Frame hierarchy module 141 is a software module stored in memory 130 for execution by processor 120 to segment each frame of video content 132a into a plurality of regions, as described in U.S. patent application Ser. No. 14/692,523, filed Apr. 21, 2015, titled "Video Object Tagging using Segmentation Hierarchy," which is hereby incorporated by reference in its entirety. Segmentation hierarchies may be based on contour detectors, whose output is the probability of each pixel boundary segment being a contour. Thresholding this probability, frame hierarchy module 141 may produce a binary contour map, which classifies pixel boundaries into contour/no-contour. The contour probability map may then be transformed into a contour saliency map, or ultrametric contour map (UCM), such that, for any threshold t, the output binary contour map may produce closed boundaries. Thus, the output of frame hierarchy module 141 may be a segmentation of the image whose contours are the ones obtained by the UCM. As such, each piece of contour in the UCM can be seen as the boundary between two (or more) regions in the image, and thus augmenting the contour strength threshold can be interpreted as merging the neighboring regions. Frame hierarchy module 141 may represent regions as nodes of a graph, and the merged region as the parent of the original regions. Accordingly, the UCM may be used to create a segmentation hierarchy.

Propagation module 143 is a software module stored in memory 130 for execution by processor 120 to propagate a selected region of a frame of video content 132a to one or more other frames of video content 132a. To propagate a selected region, propagation module 143 may calculate an optical flow, which links the pixels from one frame to the position where they have moved in the following frame. Using this information, propagation module 143 may propagate the selected region to one or more frames of the plurality of frames, which may provide an estimate of the mask of the objects in the one or more frames of the plurality of frames. The mask may be refined in subsequent frames by adapting the selected region to the segmentation hierarchies computed on the subsequent frames.

Selection module 145 is a software module stored in memory 130 for execution by processor 120 to select one or more regions of a frame of video content 132a. Selection module 145 may be configured to select, in response to input received from input device 115, a region of a frame of video content 132a. The input from the user may include a mouse click to select an element of the displayed frame of video content 132a. Alternatively, input from the user may include a touch on a touch-screen of display 195 to select an element of the displayed frame of video content 132a. Selection module 145 may be configured to select a region of video content 132a, and then to modify or alter that selection by selecting additional regions of the frame. Additionally, selection module 145 may be configured to deselect a region if the user does not want that region to be part of the selected region.

Synthetic object module 147 is a software module stored in memory 130 for execution by processor 120 to insert a synthetic object into one or more frames of video content 132. In some implementations, synthetic object module 147 may analyze a frame of video content 132 to determine a position or location of an object in the frame, a size, shape, and/or area of a region of the frame that has been selected using selection module 145, and/or a size, shape, and/or area of a portion of the frame that is not within the region selected by selection module 145. Synthetic object module 147 may search synthetic object database 134 and select a synthetic object that will fit in a portion of the frame that is not within the region selected by selection module 145. When the selected synthetic object is inserted into the frame, synthetic object module 147 may merge the object segmentation hierarchy of the synthetic object with the segmentation hierarchy of the frame, creating a merged segmentation hierarchy. In some implementations, the merged segmentation hierarchy may be used to select a portion of the synthetic object, a portion of the frame, and/or portions of the synthetic object and portions of the frame.

Tagging module 149 is a software module stored in memory 130 for execution by processor 120 to tag a selected region of a frame of video content 132a. In some implementations, a selected region may be tagged with information such as metadata tags. Metadata tags may include information about the selected region. For example, a metadata tag may describe the location of a selected region within a frame of video content 132a. A metadata tag may include information about the element corresponding to a selected region. For example, a selected region may correspond to a character in a movie and may be tagged with metadata including background information about that character, information about the actor portraying the character, or other information. In some implementations, the information included in a tag may be viewed by a consumer of tagged video content by, for instance, mousing over the character to view the information. In some implementations, a selected region may be tagged with other information, such as a list of points that define the selected region. In some implementations, tagged information may include a website or a link to a website.

Display 195 may be a television, a computer monitor, a display of a tablet computer, or a display of a mobile phone. In some implementations, display 195 may be configured to receive input from a user using a touch. Display 195 may be a light emitting diode (LED) display, an organic light emitting diode (OLED) display, a liquid crystal display (LCD), a plasma display, a cathode ray tube (CRT), an electroluminescent display (ELD), or other display appropriate for viewing video content 132a.

In some implementations, a first networked computer may perform segmentation of video frames, insertion of the synthetic object, selection of one or more regions of frames of video 132, and propagation of the selected regions, while a second networked computer may perform selection, deselection, and tagging. Server 111 includes processor 121 and memory 131, and may include input device 125. Memory 131 may include video content 132b, synthetic object database 134b, and executable code 150. Executable code 150 may include one or more software modules for execution by processor 121. As shown in FIG. 1, executable code 150 includes frame hierarchy module 151, propagation module 153, selection module 155, and synthetic object module 157. Computing device 110 and server 111 may be connected to network 123 by connection 167 and connection 187, respectively. In some implementations, system 100 may include computing device 110 and server 111, where the tagging operation is divided into a backend, performed by server 111, and a front end, performed by computing device 110, and communicated via network 123. In some implementations, frame hierarchy module 141 and/or frame hierarchy module 151 may be modified to create hierarchies that do not contain holes, i.e., segmentation hierarchies wherein each segmentation contour has only an outer boundary and does not surround an area of frame that is not included in the segmentation. Such segmentation hierarchies may allow the selection process to converge faster to the desired target region.

Figure 2:
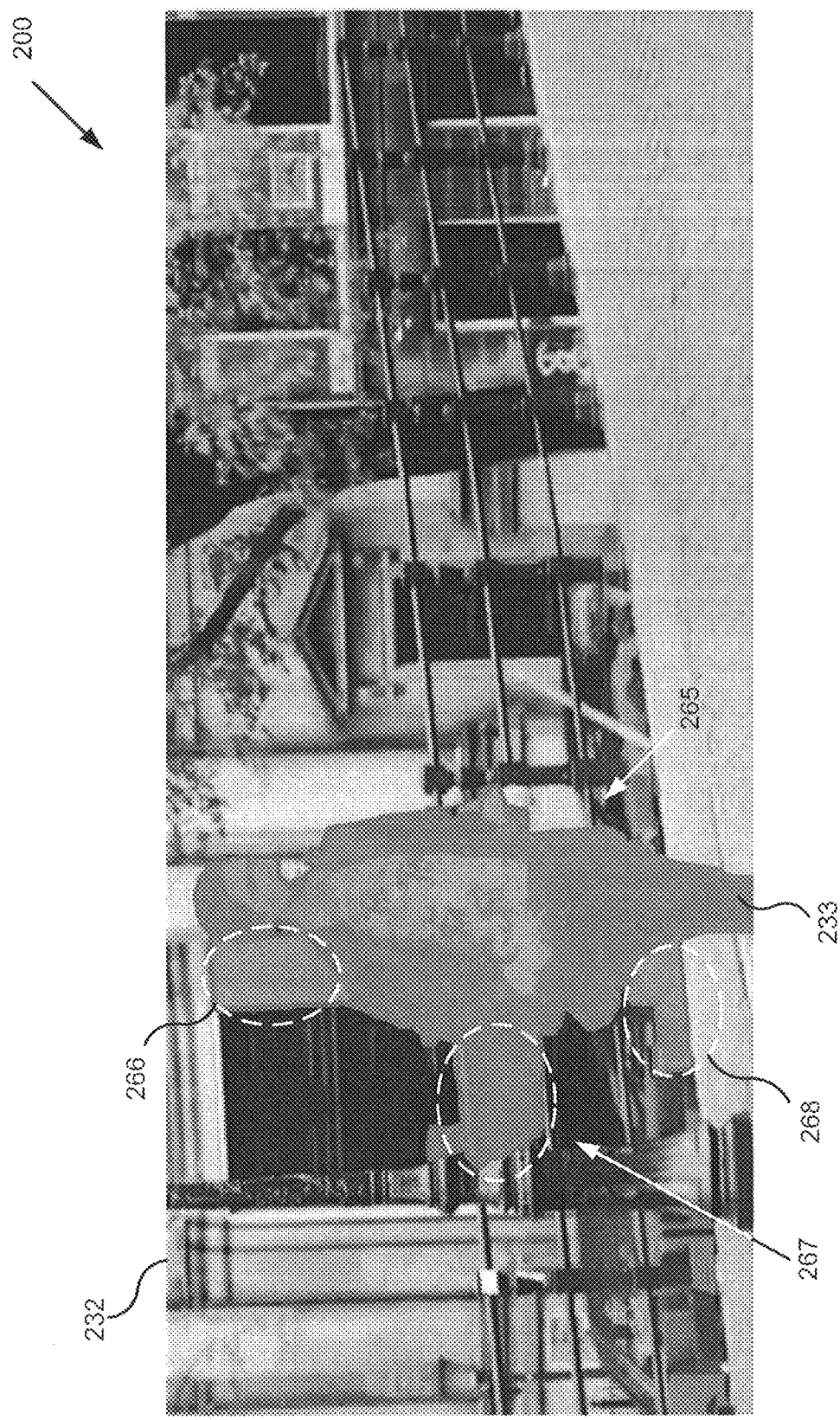
FIG. 2 shows an exemplary video frame including a video object and a first selected region, according to one implementation of the present disclosure.

FIG. 2 shows an exemplary video frame including an object and a first selected region, according to one implementation of the present disclosure. Diagram 200 includes frame 232 including object 233 and selected region 265. Selected region 265 includes object 233 and various other portions of frame 232. As shown in FIG. 2, object 233 includes an individual and items of clothing the individual is wearing. Selected region 265 includes the individual and items of clothing the individual is wearing, in addition to sections of frame 232 that are not the individual or the clothing of the individual. For example, area 266 is a portion of a building that appears behind the individual in frame 232 and is included in selected region 265. Area 267 includes a door of the building and portions of a railing appearing behind the individual in frame 232 and is included in selected region 265. Area 268 includes portions of a park bench and a vehicle appearing behind the individual in frame 232 and is included in selected region 265. Area 266, area 267, and area 268 may be examples of regions of frame 232 that are not intended to be a part of selected region 265 that are included due to the segmentation hierarchy and the process of selecting selected region 265. Such areas may be referred to as leaks or leakage.

Figure 3:
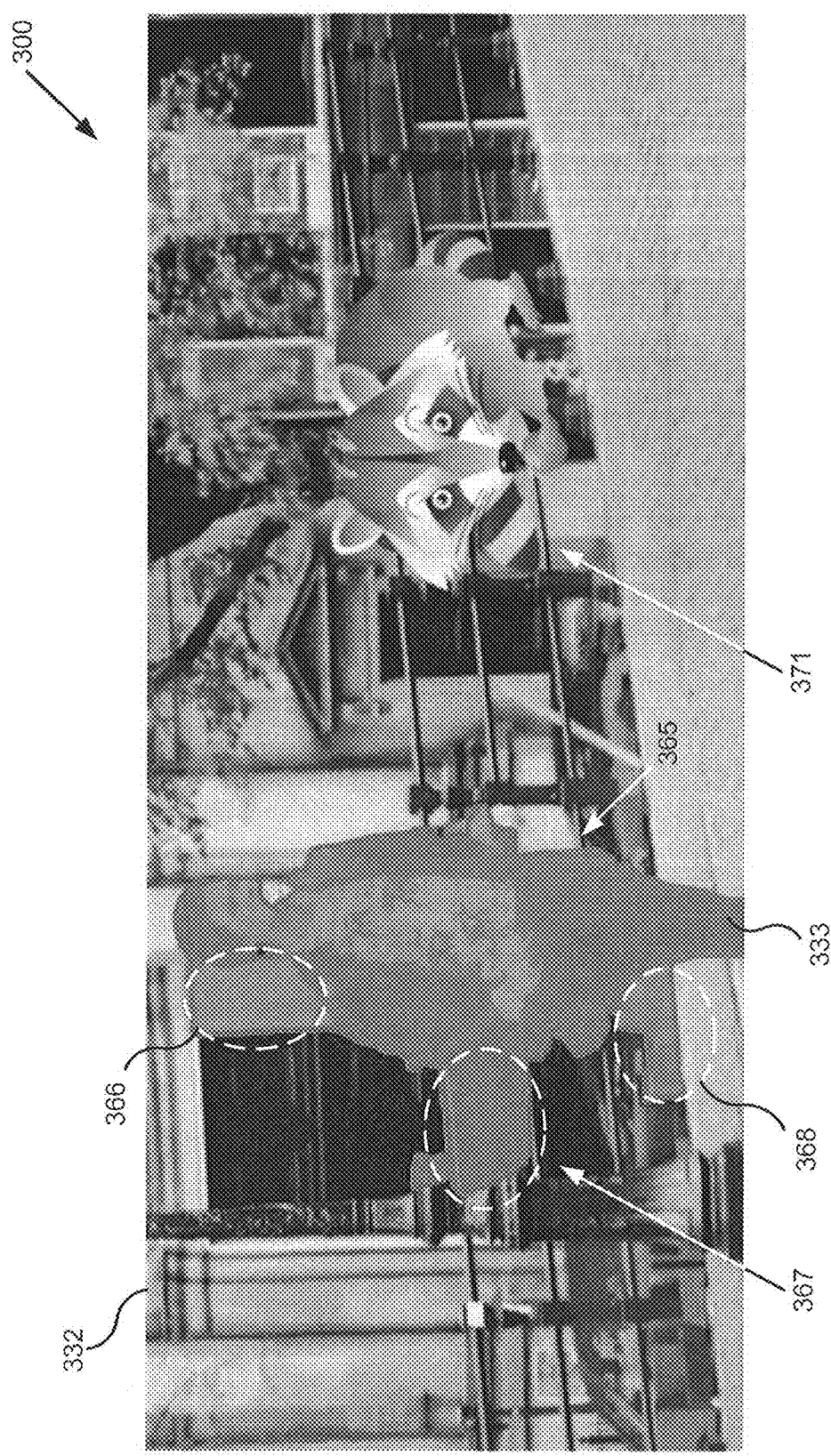
FIG. 3 shows an exemplary video frame including a video object, a selected region, and a synthetic object, according to one implementation of the present disclosure.

FIG. 3 shows an exemplary video frame including an object, a selected region, and a synthetic object, according to one implementation of the present disclosure. Diagram 300 shows frame 332 including object 333, selected region 365, and synthetic object 371. Selected region 365 includes areas 366, 367, and 368, which are leaks. Synthetic object 371 may be inserted into frame 332 by synthetic object module 147. In some implementations, synthetic object module 147 may analyze frame 332 to determine an area of frame 332 that does not include object 333 and/or selected region 365, and a shape or shapes of areas of frame 332 that do not include object 333 and/or selected region 365. Synthetic object module 147 may select synthetic object 371 from synthetic object database 134 based on the size of an area of frame 332 that does not include object 333 and/or selected region 365, the shape of an area of frame 332 that does not include object 333 and/or selected region 365, etc. In some implementations, synthetic object 371 may have an associated object segmentation hierarchy. Synthetic object 371 may alternatively be inserted into frame 332 by synthetic object module 157 using similar analysis and considerations to select and place synthetic object 371.

Figure 4:
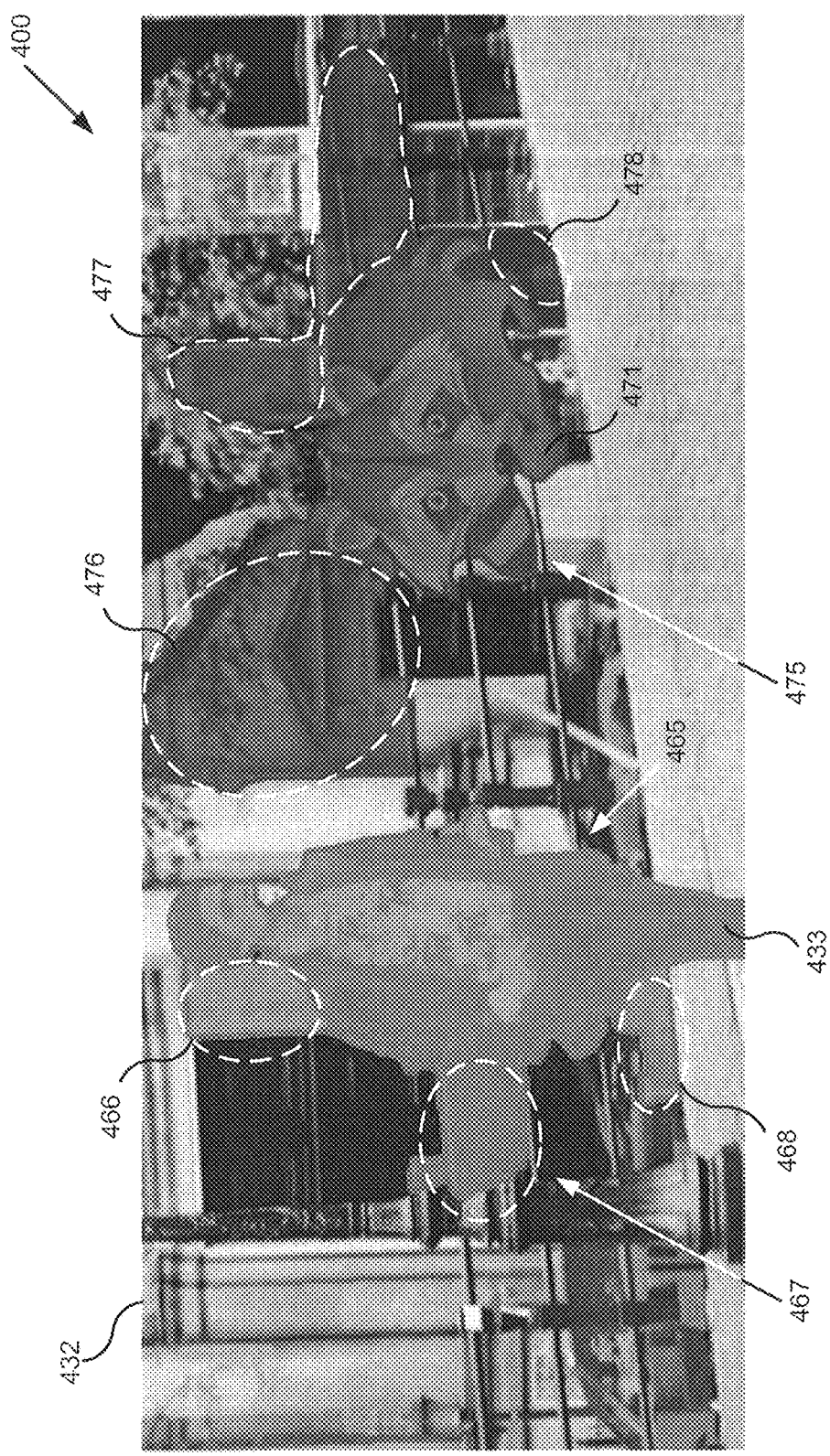
FIG. 4 shows an exemplary video frame including a video object, a first selected region, a synthetic object, and a second region, according to one implementation of the present disclosure.

FIG. 4 shows an exemplary video frame including a video object, a first selected region, a synthetic object, and a second region, according to one implementation of the present disclosure. Diagram 400 shows frame 432 including object 433, selected region 465, synthetic object 471, and selected region 475. Selected region 465 includes object 433 and areas 466, 467, and 468, which are leaks. Selected region 475 includes synthetic object 471 and areas 476, 477, and 478, which are leaks. In some implementations, the object segmentation hierarchy of synthetic object 471 may be merged with the segmentation hierarchy of frame 432. By merging the segmentation hierarchies of frame 432 and synthetic object 471, selecting and/or deselecting areas of selected region 475 may result in selection and/or deselection similar to selecting and/or deselecting areas of selected region 465. In one implementation, selection module 145 may select selected region 475 to have a similar number or the same number of leaks as selected region 465. As shown in FIG. 4, selected region 465 includes three (3) leaks, specifically, areas 466, 467, and 468, and selected region 475 includes three (3) leaks, specifically, areas 476, 477, and 478.

Figure 5:
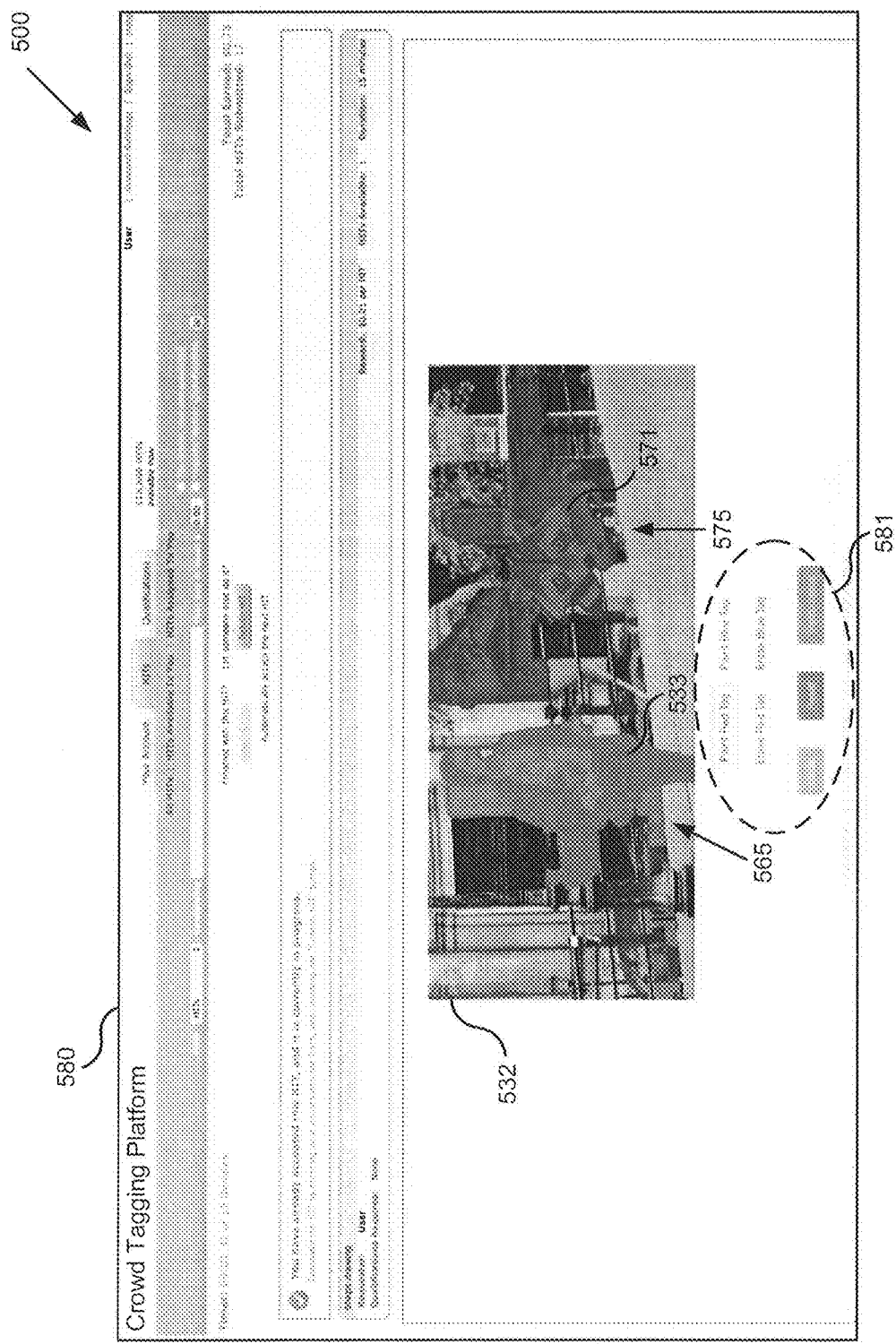
FIG. 5 shows an exemplary user interface for correcting selected regions of a video frame, according to one implementation of the present disclosure.

FIG. 5 shows an exemplary user interface for correcting selected regions of a video frame, according to one implementation of the present disclosure. Diagram 500 shows exemplary user interface 580 for a crowd tagging platform that may be used to correct selected regions of frame 532. In some implementations, a crowd user may use controls 581 of user interface 580 to make adjustments to selected region 565 and/or selected region 575. For example, the crowd user may access frame 532 over a network, such as network 123. The crowd user may use controls 581 to adjust selected region 565 to include only object 533 and to adjust selected region 575 to include only synthetic object 571. Adjusting selected region 565 may include selecting and/or deselecting areas of frame 532 based on the segmentation hierarchy of frame 532. Adjusting selected region 575 may include selecting and/or deselecting areas of frame 532 and/or synthetic object 571 based on the merged segmentation hierarchy of frame 532 and the object segmentation hierarchy of synthetic object 571. In some implementations, the crowd tagging platform may be a computer program that runs on the cloud, runs in an internet browser, and/or runs locally on the crowd user's computer.

Figure 6A:
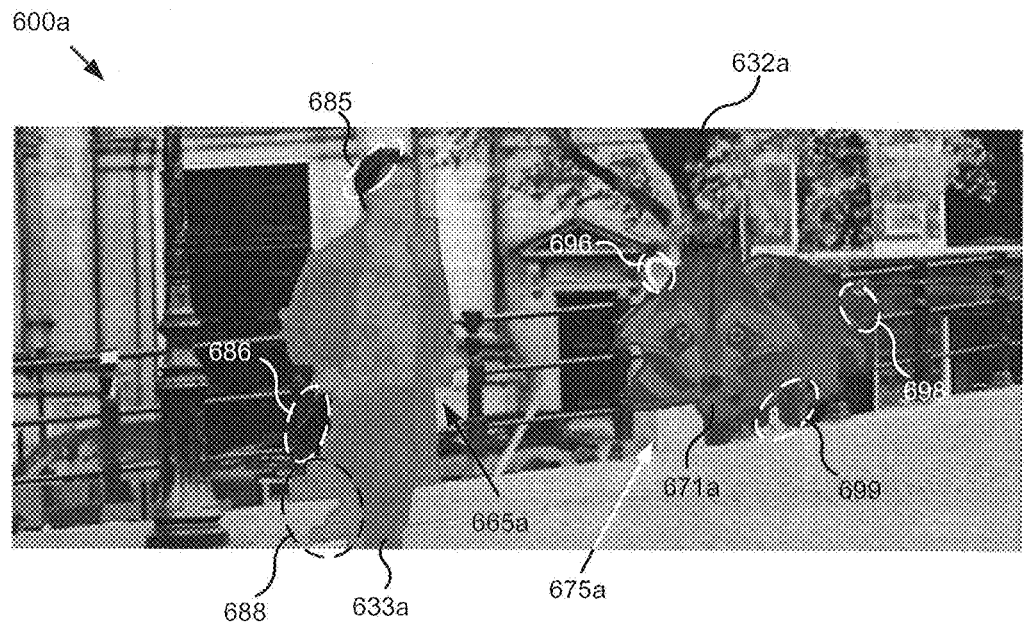
FIG. 6a shows an exemplary video frame including corrected selection regions, according to one implementation of the present disclosure.

FIG. 6a shows an exemplary video frame including corrected selection regions, according to one implementation of the present disclosure. Diagram 600a shows frame 632a including object 633a, selected region 665a, synthetic object 671a, and selected area 675a. Diagram 600a shows an example of frame 632 following adjustment by a cloud user. Adjustments to selected region 665a performed by the cloud user have reduced the area of selected region 665a, and adjusted selected region 665a to include most of object 633a. Selected region 665a includes area 688, which is a leak, and does not include area 685 and area 686, which are both part of object 633a. Specifically, area 685 includes the hair of the individual included in object 633a, and area 686 includes part of the clothing worn by the individual. Adjustment by a cloud user resulting in selected region 665a may be considered normal or average. Adjustments to selected region 675a include similar characteristics. Selected area 675a includes most of synthetic object 671a, and a few leak areas. Adjustments made by the cloud user resulting in selected area 675a include area 698 and 699, and do not include area 696. Area 696 is a portion of synthetic object 671a, and areas 698 and 699 are areas of frame 632a outside of synthetic object 671a. Similar to the adjustments made resulting in selected area 665a, the adjustments made by the cloud user resulting in selected area 675a may be considered normal or average. In some implementations, normal or average selections may not be accurate enough for use in tagging video content 132.

Figure 6B:
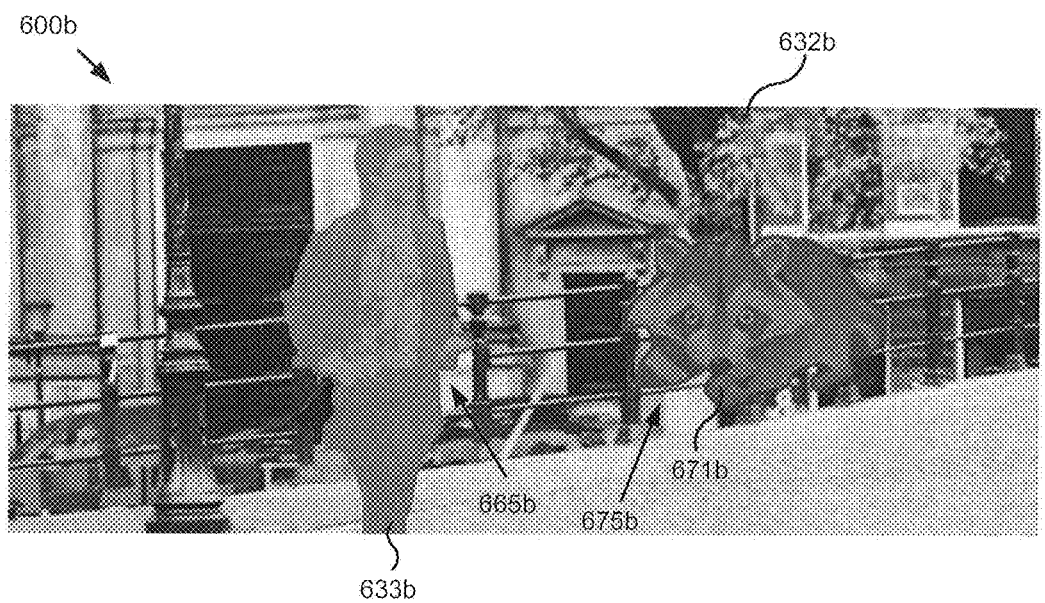
FIG. 6b shows another exemplary video frame including corrected selection regions, according to one implementation of the present disclosure.

FIG. 6b shows another exemplary video frame including corrected selection regions, according to one implementation of the present disclosure. Diagram 600b shows frame 632b including object 633b, selected region 633b, synthetic object 671b, and selected region 675b. Selected region 665b, as adjusted by a cloud user, primarily includes object 633b and has very limited leakage and/or missed areas. Similarly, selected region 675b, as adjusted by the cloud user, includes substantially the entire synthetic object 671b and includes virtually no leaks. The adjustments made by the cloud user resulting in selected area 665b and selected area 675b may be considered good, and may be accurate enough to be accepted for use in tagging video content 132.

Figure 7:
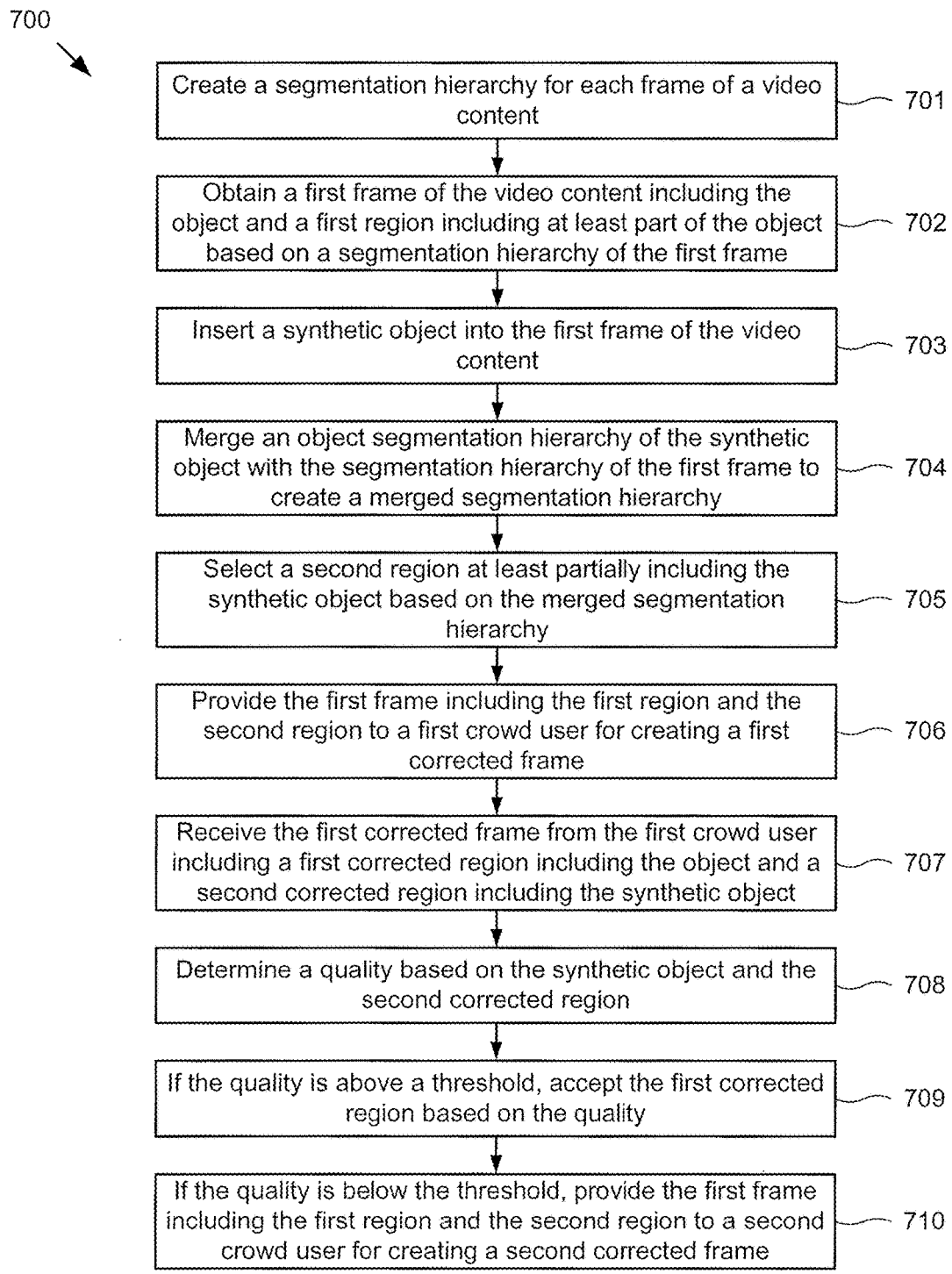
FIG. 7 shows a flowchart illustrating an exemplary method of video object tagging using synthetic objects and segmentation hierarchies, according to one implementation of the present disclosure.

FIG. 7 shows a flowchart illustrating an exemplary method of video object tagging using synthetic objects and segmentation hierarchies, according to one implementation of the present disclosure. Method 700 begins at 701, where executable code 140 creates a segmentation hierarchy for each frame of video content 132. Method 700 continues at 702, where executable code 140 obtains a first frame of video content 132 including the object and a first region including at least part of the object based on a segmentation hierarchy of the first frame. The first region may be a selected region that is propagated from a previous frame of video content 132. In some implementations, the first region may include selections of areas of the first frame surrounding the object, but that are not the object. These portions of the first region may be considered leaks. The first region may include one or more leaks, and the leaks may be related to the segmentation hierarchy of the first frame.

At 703, executable code 140 inserts a synthetic object into the first frame of video content 132. In some implementations, synthetic object module 147 may analyze the first frame of video content 132 to determine the size, shape, and/or area of the first frame that does not include the first region. Based on the size, shape, and/or area of the portion of the first frame not including the first region, synthetic object module 147 may select a synthetic object from synthetic object database 134. After selecting the appropriate synthetic object from synthetic object database 134, synthetic object module 147 may insert the synthetic object into the portion of the first frame not including the first region.

At 704, executable code 140 merges an object segmentation hierarchy of the synthetic object with the segmentation hierarchy of the first frame to create a merged segmentation hierarchy. In some implementations, the synthetic object inserted into the first frame may include an associated object segmentation hierarchy. The object segmentation hierarchy of the synthetic object may be merged with the segmentation hierarchy of the first frame to allow selection and/or deselection of the synthetic object and areas of the first frame surrounding the synthetic object similar to selection and/or deselection of the object and areas of the first frame surrounding the first object.

At 705, executable code 140 selects a second region at least partially including the synthetic object based on the merged segmentation hierarchy. In some implementations, the second region may include the entire synthetic object, part of the synthetic object, and/or portions of the first frame surrounding the synthetic object. Areas of the first frame surrounding the synthetic object may be selected and may be considered leaks in the second region. In some implementations, the number of leaks in the second region may be the same number of leaks as may be found in the first region.

At 706, executable code 140 provides the first frame including the first region and the second region to a first crowd user for creating a first corrected frame. In one implementation, providing the first frame for the first correction may include making the first frame available for the first correction on a cloud-based crowd sourcing platform. The first frame may be provided to one or more cloud users connected to network 123. For example, computing device 110 may be a computer of a cloud user connected to network 123. The user may view the first frame, including the first region and the second region on display 195. The first cloud user may make corrections to the first region and/or the second region using input device 115. In some implementations, the first cloud user may correct the first region to include only the object and correct the second region to include only the synthetic object. Method 700 continues at 707, where executable code 140 receives the first corrected frame from the first crowd user including a first corrected region including the object and a second corrected region including the synthetic object.

At 708, executable code 140 determines a quality based on the synthetic object and the second corrected region. In some implementations, the quality may be calculated based on the Jaccard similarity coefficient, where the Jaccard similarity coefficient is calculated using the shape of the synthetic object stored in synthetic object database 134 and the second corrected region provided by a cloud user. In one implementation, the quality may be calculated using a ratio of the area of the shape of the synthetic object and the second corrected region. The quality may be maximized when the corrected region selects the entire synthetic object and does not select any of the frame outside the synthetic object. For example, the entire synthetic object may be selected when each level of the object segmentation hierarchy of the synthetic object is selected and when no portion of the segmentation hierarchy of the frame is selected, i.e., when the entire synthetic object and only the synthetic object is selected. In some implementations, the quality may be saved to a profile associated with the first cloud user. The quality may be used to calculate a performance coefficient for the first cloud user based on the quality of each of a plurality of corrections performed by the first cloud user over time. In some implementations, each cloud user may have an associated account including a performance coefficient. Users with higher performance coefficients may be trusted more than users with a lower performance coefficient.

At 709, executable code 140 accepts the first corrected region based on the quality if the quality is above a threshold. In some implementations, executable code 140 may include a threshold to determine when selection of a region is of high enough quality to be accepted, such as when the quality is within a range of the maximum quality. Once the corrected region is accepted, executable code may move on to another frame to select another object, or executable code may propagate the first region to a subsequent frame, which may be the next frame in video content 132 or any subsequent frame in video 132. The subsequent frame may be provided to the first cloud user to correct the propagated region and a selected region associated with a new synthetic object inserted into the subsequent frame, and if the quality of the subsequent frame is sufficiently high, the corrected regions of the subsequent frame may be accepted. In some implementations, once a region has been accepted, propagated, and accepted again, executable code 140 may determine the object may be automatically tracked by propagation module 143.

At 710, executable code 140 provides the first frame including the first region and the second region to a second crowd user for creating a second corrected frame if the quality is below the threshold. In some implementations, the selected region may differ from the synthetic object enough to necessitate further conection of the selected area. In such a situation, the frame may be provided to a second crowd user to correct the selected region. In one implementation, the results of the first crowd user may be provided to the second crowd user for correction. In other implementations, the first frame including the first region and the second region may be provided to the second crowd user for correction to create the second corrected frame. When the correction by the second cloud user is of sufficient quality, the corrected region may be accepted.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for tagging an object in a video content including a plurality of frames, the system comprising:
a memory storing an executable code; and
a processor executing the executable code to:

obtain a first frame of the video content including the object and a first region including at least part of the object based on a segmentation hierarchy of the first frame;

insert a synthetic object into the first frame of the video content;

merge an object segmentation hierarchy of the synthetic object with the segmentation hierarchy of the first frame to create a merged segmentation hierarchy;

select a second region at least partially including the synthetic object based on the merged segmentation hierarchy;

provide the first frame including the first region and the second region to a first crowd user for creating a first corrected frame;

receive the first corrected frame from the first crowd user including a first corrected region including the object and a second corrected region including the synthetic object;

determine a quality based on the synthetic object and the second corrected region; and accept the first corrected region based on the quality.

2. The system of claim 1, wherein, prior to accepting the first corrected region, the hardware processor further executes the executable code to:

if the quality is below a threshold, provide the first frame including the first region and the second region to a second crowd user for creating a second corrected frame.

3. The system of claim 1, wherein the first selected region of the first frame is propagated from a previous frame of the plurality of frames of the video content.

4. The system of claim 1, wherein, after finalizing the image tagging, the hardware processor further executes the executable code to:

propagate the first corrected region and the second corrected region to a third frame following the second frame in the video content;

provide the third frame including the propagated first corrected region and a new synthetic region for a second correction by a second crowd user;

receive a third corrected frame from the second crowd user, the third corrected frame including an third corrected region substantially including the object and an fourth corrected region substantially including the synthetic object;

determine a second quality based on the synthetic object and the fourth corrected region; and accept the third corrected region based on the second quality.

5. The system of claim 1, wherein the synthetic object is chosen from a synthetic object database based on at least one of a size of the object, a location of the object in the first frame of the video content, and an area of the first frame of the video content that is not a part of the first region.

6. The system of claim 1, wherein the second region includes a selection of at least one portion of the video content in addition to the selection of at least a portion of the synthetic object.

7. The system of claim 1, wherein the second region further includes a portion of the video content.

8. The system of claim 1, wherein the quality is calculated using a ratio of a synthetic object shape and the second corrected region.

9. The system of claim 1, wherein providing the first frame for the first correction includes making the first frame available for the first correction on a cloud-based crowd sourcing platform.

10. The system of claim 1, wherein the calculated quality of the first correction is associated with the first crowd user.

11. A method for tagging an object in a video content including a plurality of frames, for use with a system having a non-transitory memory and a hardware processor, the method comprising:

obtaining, using the hardware processor, a first frame of the video content including the object and a first region including at least part of the object based on a segmentation hierarchy of the first frame;

inserting, using the hardware processor, a synthetic object into the first frame of the video content;

merging, using the hardware processor, an object segmentation hierarchy of the synthetic object with the segmentation hierarchy of the first frame to create a merged segmentation hierarchy;

selecting, using the hardware processor, a second region at least partially including the synthetic object based on the merged segmentation hierarchy;

providing, using the hardware processor, the first frame including the first region and the second region to a first crowd user for creating a first corrected frame;

receiving, using the hardware processor, the first corrected frame from the first crowd user including a first corrected region including the object and a second corrected region including the synthetic object;

determining, using the hardware processor, a quality based on the synthetic object and the second corrected region; and accepting, using the hardware processor, the first corrected region based on the quality.

12. The method of claim 11, wherein, prior to accepting the first corrected region, the method further comprises:

if the quality is below a threshold, provide the first frame including the first region and the second region to a second crowd user for creating a second corrected frame.

13. The method of claim 11, wherein the first selected region of the first frame is propagated from a previous frame of the plurality of frames of the video content.

14. The method of claim 11, wherein, after finalizing the image tagging, the method further comprises:

propagating, using the hardware processor, the first corrected region and the second corrected region to a third frame following the second frame in the video content;

providing, using the hardware processor, the third frame including the propagated first corrected region and a new synthetic region for a second correction by a second crowd user;

receiving, using the hardware processor, a third corrected frame from the second crowd user, the third corrected frame including an third corrected region substantially including the object and an fourth corrected region substantially including the synthetic object;

determining, using the hardware processor, a second quality based on the synthetic object and the fourth corrected region; and accepting, using the hardware processor, the third corrected region based on the second quality.

15. The method of claim 11, wherein the synthetic object is chosen from a synthetic object database based on at least one of a size of the object, a location of the object in the first frame of the video content, and an area of the first frame of the video content that is not a part of the first region.

16. The method of claim 11, wherein the second region includes a selection of at least one portion of the video content in addition to the selection of at least a portion of the synthetic object.

17. The method of claim 11, wherein the second region further includes a portion of the video content.

18. The method of claim 11, wherein the quality is calculated using a ratio of a synthetic object shape and the second corrected region.

19. The method of claim 11, wherein providing the first frame for the first correction includes making the first frame available for the first correction on a cloud-based crowd sourcing platform.

20. The method of claim 11, wherein the calculated quality of the first correction is associated with the first crowd user.

* * * * *